(12) United States Patent
Brimhall et al.

(10) Patent No.: US 11,250,629 B2
(45) Date of Patent: *Feb. 15, 2022

(54) SYSTEMS AND METHODS FOR OPTIMIZING A MODEL FILE

(71) Applicant: SEEK XR, INC., Lehi, UT (US)

(72) Inventors: Thane Brimhall, Saratoga Springs, UT (US); Thomas Griffiths, American Fork, UT (US); Trey Nelson, Provo, UT (US); Christopher Tart, Taylorsville, UT (US)

(73) Assignee: SEEK XR, LLC, Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/882,190

(22) Filed: May 22, 2020

(65) Prior Publication Data

US 2021/0366190 A1 Nov. 25, 2021

(51) Int. Cl.
| | |
|---|---|
| G06T 17/20 | (2006.01) |
| G06T 15/06 | (2011.01) |
| G06T 15/04 | (2011.01) |
| G06T 15/30 | (2011.01) |
| G06T 19/00 | (2011.01) |

(52) U.S. Cl.
CPC ............ G06T 17/205 (2013.01); G06T 15/04 (2013.01); G06T 15/06 (2013.01); G06T 15/30 (2013.01); *G06T 19/006* (2013.01)

(58) Field of Classification Search
CPC ....... G06T 17/205; G06T 15/04; G06T 15/06; G06T 15/30; G06T 19/006; G06T 19/00; G06T 15/00; G06T 11/00; G06F 30/00
See application file for complete search history.

(56) References Cited

U.S. PATENT DOCUMENTS

| | | |
|---|---|---|
| 6,208,347 B1 | 3/2001 | Migdal |
| 7,266,616 B1 | 9/2007 | Munshi |
| 7,742,061 B2 | 6/2010 | Chen |
| 10,825,236 B1* | 11/2020 | Vorobyov ............... G06T 15/20 |
| 2007/0234282 A1* | 10/2007 | Prigge .................... G06Q 10/10 717/107 |
| 2010/0033484 A1 | 2/2010 | Kim |
| 2015/0269770 A1* | 9/2015 | Jenkins ................... G06T 15/20 345/421 |
| 2017/0289341 A1* | 10/2017 | Rodriguez .......... G06F 3/04847 |
| 2017/0358133 A1* | 12/2017 | Iverson ................... G06T 3/403 |
| 2018/0143756 A1 | 5/2018 | Mildrew |
| 2018/0261037 A1 | 9/2018 | Hudson |
| 2019/0080516 A1* | 3/2019 | Petrovskaya ......... G06T 19/006 |

(Continued)

*Primary Examiner* — Phuc N Doan

(74) *Attorney, Agent, or Firm* — Workman Nydegger

(57) ABSTRACT

Systems and methods for optimizing a model file include an occlusion reduction process. The occlusion reduction process includes acts of: i) identifying one or more points on a mesh section of a model, ii) determining an occlusion value for each of the one or more points on the surface of the mesh section by performing a ray cast rendering of each of the one or more points, iii) determining whether the one or more occlusion values meet or exceed a predetermined occlusion threshold value, and iv) removing the mesh section from the model. Systems and methods for optimizing a model file may include other optimization processes, such as an instancing step, a selective decimation step, a texture reduction step, and/or a texture formatting step.

19 Claims, 9 Drawing Sheets

(56) References Cited

U.S. PATENT DOCUMENTS

| | | |
|---|---|---|
| 2019/0114061 A1 | 4/2019 | Daniels |
| 2019/0278293 A1* | 9/2019 | Levinson ............. G05D 1/0251 |
| 2019/0340834 A1 | 11/2019 | Martinez Molina et al. |
| 2019/0371073 A1 | 12/2019 | Harviainen |
| 2021/0166053 A1* | 6/2021 | Raudies ............... G06K 9/4609 |

* cited by examiner

SYSTEMS AND METHODS FOR OPTIMIZING A MODEL FILE

BACKGROUND

Technical Field

This disclosure generally relates to extended reality (XR) technologies. More specifically, the present disclosure relates to the optimization of model files for display in XR implementations.

Related Technology

In recent times, advances in computing power have enabled computing systems to provide new and varied experiences to users. One such category of new and varied user experiences relates to the areas of computer-implemented realities. For example, augmented reality (AR) is a live, direct, or indirect view of a physical, real-world environment whose elements are augmented (or supplemented) by computer-generated sensory input such as sound, video, graphics, or GPS data. Augmented reality utilizes a user's existing reality and adds to it via a computing device, display, or projector of some sort. For example, many mobile electronic devices, such as smartphones and tablets, can overlay digital content into the user's immediate environment through use of the device's camera feed and associated viewer. Thus, for example, a user could view the user's real-world environment through the display of a mobile electronic device while virtual objects are also being displayed on the display, thereby giving the user the sensation of having virtual objects together with the user in a real-world environment. Custom AR-enabled headsets can also be used.

Virtual reality (VR) is another example of a computer-implemented reality. In general, VR refers to computer technologies that use reality headsets and/or other peripheral devices to generate sounds, images, and other sensations that replicate a real environment or that form an imaginary world. Virtual reality immerses a user in an entirely virtual experience and allows the user to interact with the virtual environment. A true VR environment engages all five senses (taste, sight, smell, touch, sound), but as used herein, the term "virtual reality" or "VR" is intended to include those computer-implemented realities that engage at least the user's sense of sight and that do not display the user's immediate visual environment.

Another example of a computer-implemented reality is a hybrid reality called mixed reality (MR). Mixed reality represents the merging of real and virtual worlds to produce new environments and visualizations where physical and digital objects co-exist and interact in real time. Many MR implementations place new imagery within a real space and often do so in such a way that the new imagery can interact—to an extent—with what is real in the physical world. For example, in the context of MR, a user may view a white board through an MR-enabled headset and use a digitally produced pen (or even a capped physical pen) to write on the white board. In the physical world, no writing appears on the white board, but within the MR environment, the user's interaction with a real-world object caused a digital representation of the writing to appear on the white board. In MR systems, some synthetic content can react and/or interact with the real-world content in real time.

An umbrella term, namely extended reality (XR), incorporates each of the forms of computer-generated reality content—AR, VR, and MR. As used herein, the term "extended reality" or "XR" refers generally to all real and virtual combined environments and human-machine interactions generated by computer technology and wearables. Extended reality includes all its descriptive forms, such as digital representations made or displayed within AR, VR, or MR.

Extended reality experiences are a fairly recent development, and as a result, many different entities are each developing their own XR rendering platforms and corresponding model or scene files to be used on those platforms. For example, Apple Corporation has a rendering platform known as ARKit, which uses AR object files in the .usdz format and/or the .reality format to provide AR experiences to a user. Android Corporation provides the ARCore platform and uses the .gltf format and/or the .glb format. Other platforms and/or implementations use any of the foregoing and/or the .obj, .fbx, .dae, and/or .sfb format to provide AR user experiences to a user.

Experienced and novice developers often create AR experiences from existing 3D model files, which are then saved in an appropriate AR object file format for presentation on an end user AR platform. 3D model files typically include large amounts of object data (e.g., vertices, edges, faces, textures, NURBS modeling data) in order to provide a realistic representation of the modeled content. Consequently, high-quality 3D model files and AR scene files that implement high-quality 3D model files are quite large (e.g., on the order of hundreds of megabytes in size).

In many instances, presenting XR content to a user is a computationally intensive process. For example, presenting AR content often involves depth detection, surface reconstruction, tracking of the viewing device (e.g., a smart phone, tablet, laptop, or head-mounted display (HMD)), and/or rendering 3D models anchored to real-world objects (which are sometimes moving) relative to the viewing device. AR platforms vary widely in their hardware specifications and capabilities, ranging from lower-end handheld devices (e.g., smartphones) to dedicated AR HMDs. Because of the computational expense involved with presenting AR content, many consumer AR platforms (e.g., handheld devices) are unable to present AR experiences that include detailed 3D models that are large in file size. In some instances, consumer AR platforms fail to provide a seamless AR experience or the AR platform crashes when attempting to render detailed 3D models of an AR scene file. Some AR platforms become damaged when attempting to render complex AR scenes.

This restricts the ability of users to share AR experiences with other users and prevents experienced and novice developers from being able to reach large swaths of consumers with their AR content. Consequently, developers typically create AR experiences that are geared to high-end AR platforms (e.g., AR HMDs, tablets, or desktop computers with high processing capabilities, etc.). Although some general optimization/compression methods exist for 3D models (e.g., geometric compression), these compression methods often result in loss of visual fidelity and fail to account for special circumstances associated with presenting AR environments (e.g., presenting the model in conjunction with a real-world environment).

Accordingly, there are a number of disadvantages with the optimization of model files for display in XR that can be addressed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Implementations of the present disclosure solve one or more of the foregoing or other problems in the art with the optimization of model files for display in XR. In particular, one or more implementations can include a method for optimizing a model file, such as a 3D model file, or an AR scene or model file that includes 3D models.

In some embodiments, a method for optimizing a model file includes an occlusion reduction process. The occlusion reduction process may include acts of: i) identifying one or more points on a mesh section of a model, ii) determining an occlusion value for each of the one or more points on the surface of the mesh section by performing a ray cast rendering of each of the one or more points, iii) determining whether the one or more occlusion values meet or exceed a predetermined occlusion threshold value, and iv) removing the mesh section from the model.

In some embodiments, the method for optimizing a model file includes other optimization processes, such as an instancing step, a selective decimation step, a texture reduction step, and/or a texture formatting step. An optimized model file may be converted into various 3D model and/or AR object or scene file formats for use on various AR platforms.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which.

DETAILED DESCRIPTION

Figure 1:
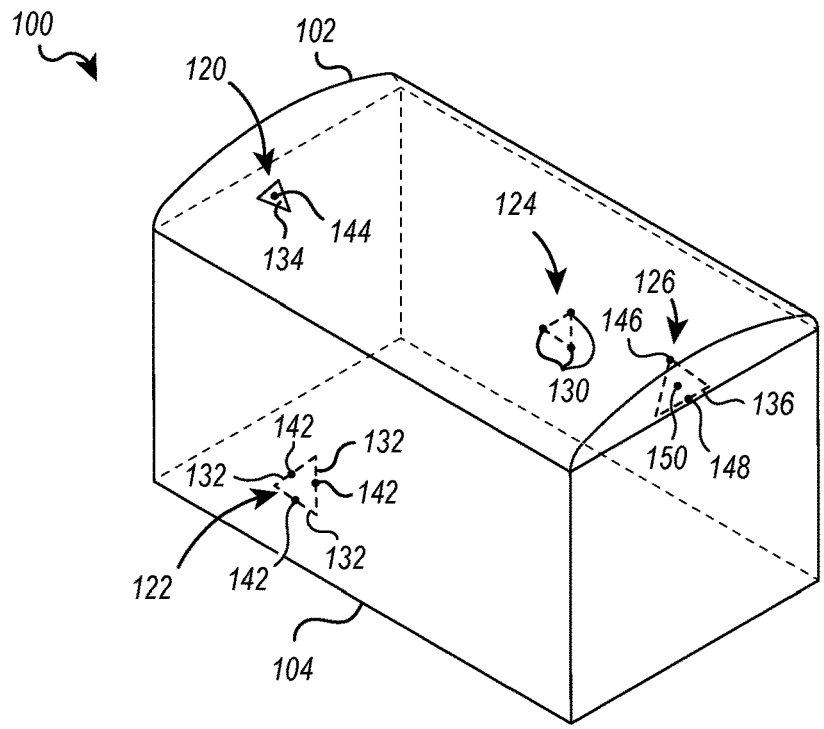
FIG. 1 illustrates an example representation of various vertices, surfaces, and edges of a mesh of a model.

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, any headings used herein are for organizational purposes only, and the terminology used herein is for the purpose of describing the embodiments. Neither are not meant to be used to limit the scope of the description or the claims.

Overview

Experienced and novice developers often create augmented reality (AR) experiences from existing 3D model files, which are then saved in an appropriate AR object file format for presentation on an end user AR platform. 3D model files typically include large amounts of object data (e.g., vertices, edges, faces, textures, NURBS modeling data) in order to provide a realistic representation of the modeled content. Consequently, high-quality 3D model files and AR scene files that implement high-quality 3D model files are quite large (e.g., on the order of hundreds of megabytes in size).

In many instances, presenting XR content to a user is a computationally intensive process. For example, presenting AR content often involves depth detection, surface reconstruction, tracking of the viewing device (e.g., a smart phone, tablet, laptop, or head-mounted display (HMD)), and/or rendering 3D models anchored to real-world objects (which are sometimes moving) relative to the viewing device. AR platforms vary widely in their hardware specifications and capabilities, ranging from lower-end handheld devices (e.g., smartphones) to dedicated AR HMDs. Because of the computational expense involved with presenting AR content, many consumer AR platforms (e.g., handheld devices) are unable to present AR experiences that include detailed 3D models that are large in file size. In some instances, consumer AR platforms fail to provide a seamless AR experience or the AR platform crashes when attempting to render detailed 3D models of an AR scene file. Some AR platforms become damaged when attempting to render complex AR scenes.

This restricts the ability of users to share AR experiences with other users and prevents experienced and novice developers from being able to reach large swaths of consumers with their AR content. Consequently, developers typically create AR experiences that are geared to high-end AR platforms (e.g., AR HMDs, tablets, or desktop computers with high processing capabilities, etc.). Although some general optimization/compression methods exist for 3D models (e.g., geometric compression), these compression methods often result in loss of visual fidelity and fail to account for special circumstances associated with presenting AR environments (e.g., presenting the model in conjunction with a real-world environment).

Disclosed embodiments are directed to systems and methods for optimizing a model file includes an occlusion reduction process. The occlusion reduction process may include acts of: i) identifying one or more points on a mesh section of a model, ii) determining an occlusion value for each of the one or more points on the surface of the mesh section by performing a ray cast rendering of each of the one or more points, iii) determining whether the one or more occlusion values meet or exceed a predetermined occlusion threshold value, and iv) removing the mesh section from the model.

Furthermore, in some instances, the method for optimizing a model file includes other optimization processes, such as an instancing step, a selective decimation step, a texture reduction step, and/or a texture formatting step. The selective decimation and/or texture reduction steps may be based on a real-world distance threshold, that may be based on a predefined viewing distance and a screen pixel size. The method then includes outputting an optimized model file. The optimized model file may be converted into various 3D model and/or AR object or scene file formats for use on various AR platforms.

Those skilled in the art will appreciate that the disclosed embodiments may address many problems associated with the optimization of model files for display in AR environments. For instance, low-end AR platforms (e.g., handheld devices with limited hardware capabilities) may not be able to render AR experiences that include detailed 3D models. Additionally, at least some optimization methods of the present disclosure account for the real-world environments in which a user will experience the 3D models of the AR content, providing optimizations techniques that are uniquely tailored to AR experiences. Furthermore, at least some optimization techniques disclosed herein allow for reduction in the file size of 3D model files and/or AR model or scene files without sacrificing visual fidelity. Still furthermore, those skilled in the art will appreciate that the methods disclosed herein may be implemented in conjunction with other optimization techniques (e.g., geometric compression) to further reduce the size of the 3D model files and/or AR model or scene files (albeit with a loss in visual fidelity).

Disclosed embodiments may allow AR content developers to confidently develop AR content for use on lower-end AR platforms (e.g., smartphones), thus opening new markets and allowing users to share AR experiences peer-to-peer without concern that an AR experience will be unrenderable on a peer's AR platform.

As used herein, the terms "optimal," "optimum," "optimize," and derivative forms thereof (e.g., optimization, optimizing) are intended to connote the transformation and/or change from a base form or state to a new form or state. Such transformation is marked by the new form or state having at least a marginal improvement/benefit compared to the base form or state. In other words, the new form or state resulting from "optimization" of the base form or state exists as an at least marginally improved base form or state. As a non-limiting example, an "optimized" 3D image file can be generated by reducing the file size of a base 3D image file. Preferably, and as exemplified by processes and embodiments described herein, an "optimization" step that reduces the file size can also maintain the perceived visual fidelity of the 3D image. The "optimized" 3D file can therefore be said to have been transformed from a base state to a new state marked by at least a marginal improvement with respect to its storage requirements.

As an additional, non-limiting example, an "optimized" 3D image file can undergo an "optimization" process that reduces the number of rendered vertices while, preferably, maintaining perceptible visual fidelity of the rendered 3D image. As such, the "optimized" 3D file can be said to have been transformed from a base state to a new state marked by at least a marginal improvement with respect to the efficiency by which it can be rendered. Such efficiency can be measured, for example, as a reduced number of processing cycles required to complete the rendering. Where "optimization" involves the at least a marginal improvement to rendering or visualization efficiency, it can also preferably maintain perceptible visual fidelity of the rendered image. As used herein, the term "perceptible visual fidelity" is intended to encompass those renderings whose visible surfaces are either objectively or subjectively the same (or substantially similar to one another).

It should be appreciated that these foregoing terms can refer to any number of components, implementations, processes, embodiments, states, outputs, and/or other elements that provide or enable such marginal improvement/benefit, and these terms should not be construed as necessarily meaning a singular component, implementation, process, embodiment, state, output, and/or other element that provides a highest degree of improvement/benefit.

Systems and Methods for Optimizing a Model File

FIG. 1 illustrates an example representation of various vertices, surfaces, and edges of a mesh of a model 100. In the exemplary embodiment shown, model 100 is a 3D model of a piece of furniture, which a computing system receives as a 3D model file (comprising the 3D furniture object) or an AR model or scene file (comprising 3D models that include the 3D furniture object). AR model or scene files take on various forms, such as .usdz, .reality, .gltf, .glb, .obj, .fbx, .dae, or .sfb formats. Similarly, 3D model files take on various forms, such as 3DS, A3D, COB, SCN, C4D, DAE, DXF, IGES, IV, FBX, KMZ, LW, LWB, LWM, LWO, LWS, LXO, MA, MB, MAX, OBJ, PLY, SKP, STEP, STL, WRL, WRL97, VRML, X, X3D, or XS formats. It will be appreciated that the optimization techniques disclosed herein are not limited to 3D models of any particular 3D model file or AR model or scene file format.

In this regard, at least some of the optimization processes disclosed herein are performed by a computing system that obtains, receives, and/or identifies a 3D model or object that is part of a 3D model file or an AR model or scene file. Exemplary computing systems are discussed hereinafter.

As shown in FIG. 1, model 100 includes a plurality of mesh sections 120, 122, 124, and 126 that form the model 100 (not all mesh sections that model 100 is comprised of are shown, for clarity). The example mesh sections 120, 122, 124, and 126 of model 100 shown in FIG. 1 are illustrated as triangular sections, although the disclosed embodiments are not so limited. For example, a mesh section may take the form of any polygonal or curved section that forms the mesh of the model 100.

Figure 5A:
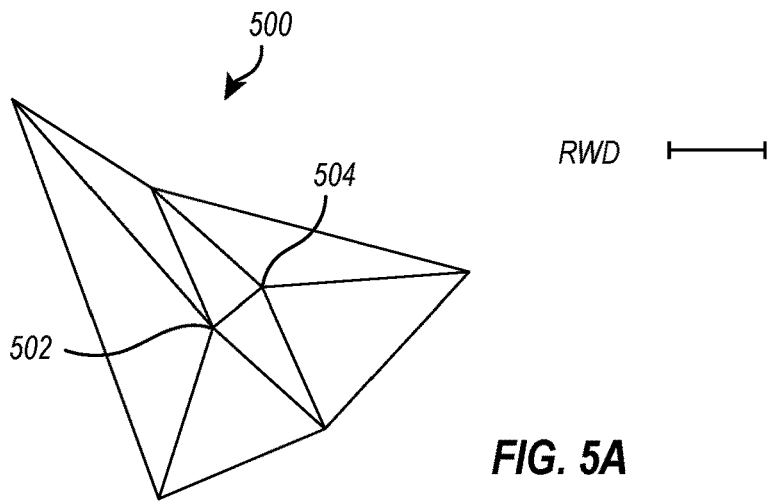
FIGS. 5A and 5B illustrate conceptual representations of selective decimation and texture reduction processes.
Figure 5B:
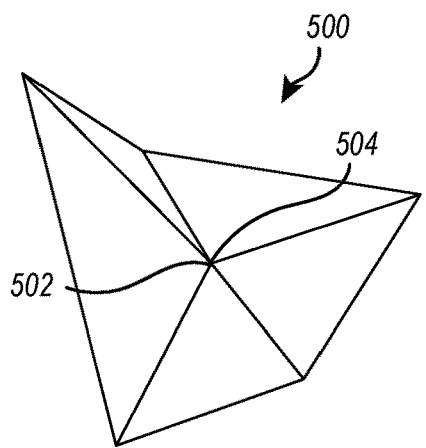

The mesh sections 120, 122, 124, and 126 include vertices, which are points shared by three or more adjacently arranged mesh sections of model 100 (see also vertices 532 and 534 of FIGS. 5A and 5B; adjacently arranged mesh sections are not shown in FIG. 1). For clarity, only the vertices 130 of mesh section 124 are labeled in FIG. 1. The mesh sections 120, 122, 124, and 126 also include edges, which are lines shared by two adjacent mesh sections. For clarity, only the edges 132 of mesh section 122 are labeled in FIG. 1. The mesh sections 120, 122, 124, and 126 also include surfaces that fill the space between each edge and vertex of a mesh section. For clarity, only the surface 134 of mesh section 120 is labeled in FIG. 1.

Mesh section 120 is shown as being positioned on a top (exposed) side of a top element 102 of the model 100 (e.g., representing a pillow of an ottoman), mesh section 122 is shown as being positioned on a bottom side 104 of the model 100 (in dotted lines), mesh section 124 is shown as being positioned on an under (covered) side of the top element 102 of the model 100 (e.g., on an underside of the pillow of the ottoman, shown in dotted lines), and mesh section 126 is shown as being positioned on the underside of the top element 102 of the model, but with one edge 136 of the mesh section 126 being arranged along a side of the model 100 and therefore exposed/viewable.

One aspect of optimizing a model file, according to the present disclosure, is performing an occlusion reduction process. When interacting with a 3D model on a conventional computer interface, it is often necessary to preserve model characteristics that are not visible when viewing the model from its exterior (e.g., threads of a screw in an CAD file of an engineering part). However, in many AR scenarios, only a final visual of an exterior of the model is needed (e.g., when placing furniture in a real-world environment while shopping). Therefore, in an AR implementation, at least some interior mesh sections of the model may be removed from the 3D model file, thereby reducing its size and usability in mobile AR experiences.

An occlusion reduction process may include identifying one or more points on a surface of a mesh section of the model. As illustrated in FIG. 1, various points of a mesh section of a model 100 may be considered when performing an occlusion reduction process. In some instances, a system identifies a center (or other) point of a surface of a mesh section, such as center point 144 of surface 134 of mesh section 120. In some instances, a system identifies a vertex point of a mesh section, such as any number of the points of vertices 130 of mesh section 124. Furthermore, in some instances, a system identifies one or more points along an edge of a mesh section, such as center points 142 of edges 132 of mesh section 122. Additionally, in some implementations, a system identifies various combinations of surface points, edge points, and/or vertex points as part of the occlusion reduction process, such as a vertex point 146, edge point 148, and surface point 150.

A system may identify any number of points of a mesh section to carry out an occlusion reduction process, however, a greater number of points may be correlated with a more accurate occlusion reduction process (e.g., to avoid over-reduction). For example, in some embodiments, a computer system identifies a center point of the surface, a center edge point for each edge, and all vertex points associated with a mesh section upon which the occlusion reduction process will be performed.

Upon identifying the desired points of one or more mesh sections, the system performs ray cast rendering on each of the points. Ray cast rendering includes casting various rays (representing, e.g., ambient light) toward the identified points to determine whether the rays are occluded by other parts of the model or whether they reach the identified points. The system determines an occlusion score for each of the identified points based on the number of rays that reach the identified point.

Figure 2:
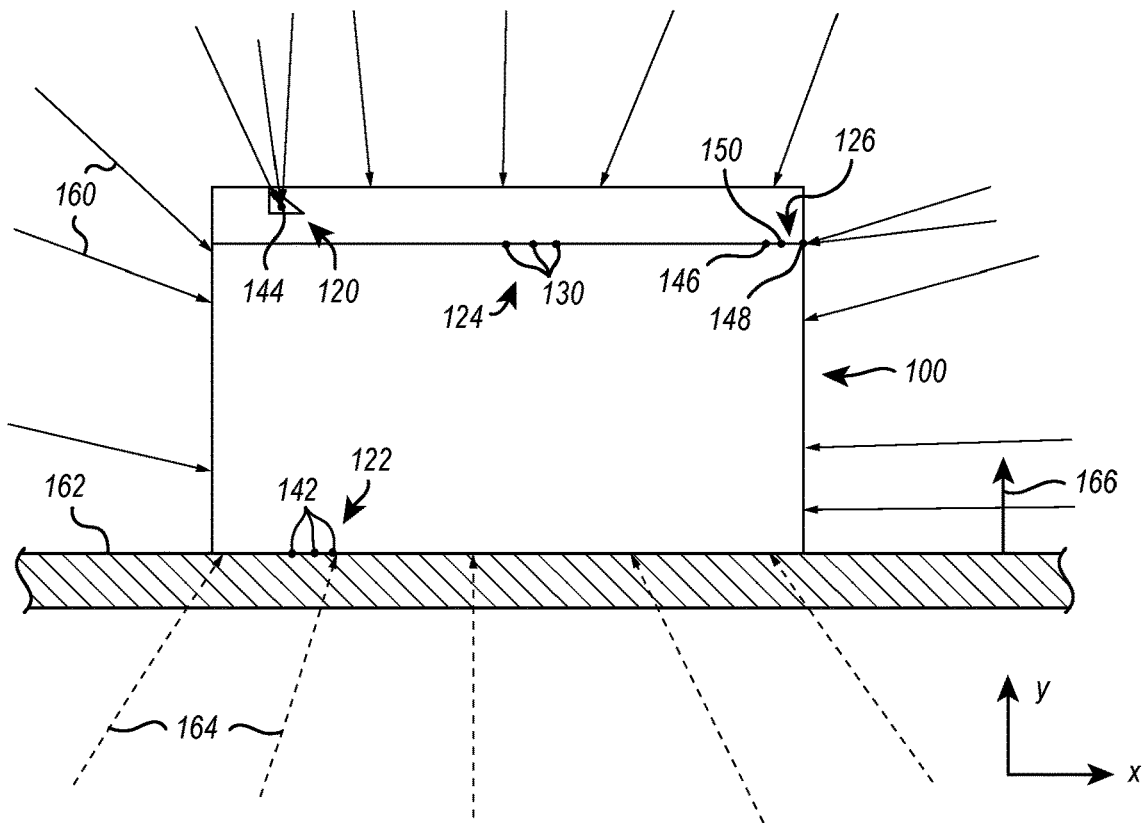
FIG. 2 illustrates a conceptual representation of performing ray cast rendering on various points of the model.

FIG. 2 illustrates a conceptual representation of performing ray cast rendering on various points of the model 100. As shown, various rays 160 are cast toward the various points identified on mesh sections 120, 122, 124, and 126. Although the rays 160 are shown in FIG. 2 as being cast in a particular arrangement, and only a particular number of rays are shown, those skilled in the art will recognize that any configuration and/or number of rays cast toward the various identified points is within the scope of this disclosure. By way of non-limiting example, all rays can be cast radially inward toward a center point positioned on one of the identified points, and the process can be repeated for each identified point. Rather than casting rays radially inward, in some instances, the system casts rays from various point or geometric sources, sequentially or concurrently. In some embodiments, the system performs ray cast rendering in only a single iteration, wherein the system casts all rays once and assesses which, if any, points were reached by the rays.

In the embodiment illustrated in FIG. 2, the system accounts for environmental surfaces when performing ray cast rendering. In some embodiments, the system determines whether the model 100 will be visible from certain viewing angles when implemented in an AR experience. This may, for example, be based on a real-world surface to which the model 100 will be anchored when implemented in an AR experience (or a surface, whether real or virtual, that the model 100 will be displayed within a threshold proximity to when implemented in an AR environment). For instance, FIG. 2 shows model 100 being positioned on a representation of a floor 162 to indicate that a computing system may determine that model 100 will be anchored to a floor when implemented in an AR environment. FIG. 2 illustrates upward rays 164, in dotted line, extending upward from below the floor 162 to illustrate that the computing system may, in some embodiments, omit one or more rays that have a directional component that is in the same direction as a normal vector associated with an environmental surface (in this case, floor 162). In this regard, the system may omit from calculation rays associated with one or more environmental surfaces (e.g., surfaces to which the model 100 will be anchored in an AR environment). By omitting one or more rays, the system may reduce the computational costs associated with performing ray cast rendering. In other implementations, rather than omitting rays, the system adds an environmental surface as an additional constraint on the ray cast rendering, such as by treating a portion of the model that would abut or be occluded by an environmental surface as an occlusive plane when performing the ray cast rendering. For example, a system may determine that an opening of a 3D model of a glove will be occluded when presented in an AR environment on a user's hand. In response, the system may treat the opening of the glove as an occlusive surface for purposes of ray cast rendering.

Omitting rays and/or implementing an occlusive plane/surface may prevent rays from reaching identified points of the 3D model that would otherwise would, and therefore may allow for additional mesh sections of the 3D model 100 to be removed, as discussed in more detail hereafter.

Those skilled in the art will recognize that any surface or plane, whether stationary, moving, flat, curved, environmental, or part of the model 100 itself, may provide the basis for omitting one or more rays from ray cast rendering. For example, certain 3D objects may be presented in an AR environment on a ceiling, wall, or distanced far from the user with a predefined portion of the 3D model facing the user (e.g., a 3D model of a distant mountain). In such instances, the computing system may omit rays that share a directional component with a viewing plane from which the 3D model will not be viewed in an AR implementation, or implement an occlusive plane into the ray cast rendering to account for viewing constraints that will be realized when the model is presented in an AR experience.

It should also be noted that the computing system may selectively omit portions of the 3D model from ray cast rendering and/or the occlusion reduction process altogether, such that the system does not perform ray cast rendering or the on the mesh sections of the omitted portions of the 3D model. By way of non-limiting example, the computing system may determine that certain portions of the 3D model are transparent and are therefore likely intended to be viewed when implemented in an AR environment (e.g., windows). Transparent surfaces will typically not fully occlude light from transmitting through the transparent surface, and so transparent surfaces may be omitted without disrupting the accuracy of ray cast rendering. The system may then omit such portions of the 3D model from ray cast rendering.

The system may selectively enable or disable specular reflection when performing ray cast rendering, and, in some instances, specular reflection is only enabled for certain model or environmental surfaces.

The system calculates an occlusion value for each of the identified points upon which the system performs ray cast rendering. The occlusion value for each identified point may correspond to the number of rays that reach (or fail to reach) the particular identified point. In some instances, the occlusion value is represented as a percentage of the number of rays cast (e.g., total rays cast, or rays cast from particular directions, positions, and/or sources) that reach (or fail to reach) the identified point. In other instances, the occlusion value is treated as a binary value, registering as "1" if any ray reaches the identified point and "0" if otherwise (or vice versa). Those skilled in the art will recognize that the form for representing an occlusion value will vary across different implementations. For simplicity in explanation, the remainder of this disclosure will treat an occlusion value as high if a large number of rays are occluded from reaching an identified point, and low if otherwise (e.g., if a large number of rays reach the identified point).

FIG. 2 shows several rays 160 reaching center point 144 of mesh section 120. Accordingly, center point 144 will have a low occlusion value that indicates that center point 144 is not occluded and would be visible to a user in an AR implementation. FIG. 2 shows that no rays 160 reach any vertex points 130 of mesh section 124 (e.g., because it is covered by top element 102), and so mesh section 124 will have a high occlusion value indicating that vertex points 130 are completely occluded and would be invisible to a user in an AR implementation. FIG. 2 also shows that, as to mesh section 126, no rays reach vertex point 146 or center point 150, but at least some rays reach edge point 148. Accordingly, vertex point 146 and center point 150 will have high/maximum occlusion values, while edge point 148 will have a lower occlusion value.

In the implementation shown in FIG. 2, the system omits rays 164 from the ray cast rendering because they are associated with an environmental surface (i.e., the floor 162). In some instances, the system identifies whether rays (e.g., rays 164) share a directional component with a normal vector of an environmental surface (e.g., floor 162) against which the model 100 will be displayed in an AR implementation (e.g., where the model 100 will be displayed within a threshold proximity to the environmental surface in an AR implementation). For example, a system may identify that the model 100 will be displayed within a threshold proximity to the floor 162 in an AR implementation, and/or that rays 164 share a directional component with a normal vector 166 of the floor 162. In particular, the system may identify that rays 164 and normal vector 166 both have a component in the positive y direction (e.g., as indicated by the axis shown in FIG. 2). The system may treat floor 162 as an occlusive surface within the environment that prevents rays 164 from reaching the bottom of the model 100. Accordingly, no rays 164 reach edge center points 142 of mesh section 122, giving edge center points 142 a high/maximum occlusion value. This result differs from what would occur if the system did not omit rays 164 or treat floor 162 as an occlusive surface, which would result in treating edge center points 142 as being unoccluded and therefore resulting their persistence in an AR implementation (thus unnecessarily increasing the final file size by maintaining points/mesh sections that would not be visible to a user in an AR implementation).

A system may also omit rays that are associated with surfaces of other models or 3D objects, such as rays that share a directional component with a normal vector of a surface of another virtual object that will be presented within a threshold proximity to the model 100 in an AR implementation (or in any 3D graphics implementation).

Upon determining the occlusion values for the various identified points of the various mesh sections, the system determines whether the occlusion values meet or exceed a predetermined occlusion threshold value. The predetermined occlusion threshold value may take on various forms, such as a predefined number of rays that fail to reach a point, a threshold percentage of rays that fail to reach a point, and/or an identified binary value corresponding to total occlusion (e.g., a value of 1 for total occlusion). In some implementations, the system compares the occlusion value for each identified point with the predetermined occlusion threshold value to determine whether each identified point is occluded or not. For instance, if an occlusion threshold is set as a binary requiring absolute occlusion for a point to be considered as having met or exceeded the occlusion threshold, a point with an occlusion value that corresponds with only one or few rays reaching the point will still be considered as unoccluded, having failed to meet or exceed the occlusion threshold. In other instances, a similar point would be considered occluded if the occlusion threshold were set to only require substantial occlusion rather than complete occlusion (e.g., 95% occlusion). Setting an occlusion threshold that requires complete occlusion (e.g., 100% occlusion) may ensure a more accurate output model file by ensuring that no unoccluded mesh sections are removed from the model (as discussed hereafter).

Referring again to the embodiment shown in FIG. 2, if, for example, the system is configured to require complete occlusion for an occlusion value to meet or exceed the predetermined occlusion threshold value, center point 144 of mesh section 120 and edge center point 148 of mesh section 126 will be considered unoccluded, and vertex points 130 of mesh section 124, vertex point 146 and center point 150 of mesh section 126, and edge center points 142 of mesh section 122 will be considered occluded.

Upon determining whether each point is occluded (e.g., by comparing the occlusion values of the various points with the predetermined occlusion threshold), the system may determine a mesh section occlusion value for each mesh section with points whose occlusion values were assessed by the system. In some instances, a mesh section occlusion value is determined based on the number of points of the particular mesh section that have been determined to be occluded (e.g., a percentage or ratio). In some instances, more weight is given to certain points of a mesh section when determining a mesh section occlusion value (e.g., center points can be given more weight). For example, returning to FIG. 2, all points associated with mesh section 120 will be considered unoccluded, and so mesh section 124 will have a low/zero mesh section occlusion value. Points associated with mesh sections 124 and 122 will be considered occluded, and so mesh sections 124 and 122 will have a high/maximum mesh section occlusion value. Some points associated with mesh section 126 will be considered occluded (e.g., vertex point 146 and center point 150), while others will be considered unoccluded (e.g., edge center point 148), and so mesh section 124 will have an intermediate mesh section occlusion value.

The system may then determine whether the mesh section occlusion values of the various mesh sections meet or exceed a predetermined mesh section occlusion threshold. In some embodiments, the system removes mesh sections from the model that have mesh section occlusion values that meet or exceed the predetermined mesh section occlusion threshold. A predetermined mesh section occlusion threshold may represent total occlusion (e.g., a mesh section occlusion value of 100%) or represent any other amount of occlusion (e.g., 80% occlusion). Referring again to the embodiment shown FIG. 2, with a predetermined mesh section occlusion threshold that requires total occlusion, the mesh section occlusion value of mesh section 120 is low and will therefore not meet the threshold. Accordingly, the system will not remove mesh section 120 from the model 100 as part of the occlusion reduction process. In contrast, mesh sections 124 and 122 have maximum mesh section occlusion values and will therefore meet the mesh section occlusion threshold. Consequently, the system will remove mesh sections 124 and 122 from the model 100, thereby reducing the size of the model and improving AR implementations on various AR platforms. The system will also remove mesh section 126 from the model 100 because at least some of its points are unoccluded, which brings the mesh section occlusion value below the maximum and below the mesh section occlusion threshold (requiring, in this example, total occlusion). However, in other embodiments, a system may remove mesh section 126 if its mesh section occlusion value meets a mesh section occlusion threshold that does not require complete occlusion (e.g., a mesh section occlusion value of 66%).

It will be appreciated that the system may determine whether to remove a mesh section based on occlusion values in other ways as well. For instance, in other embodiments, instead of first checking each occlusion value of each point against a point-level occlusion threshold, the system determines a mesh section occlusion value based on a combination of the occlusion values of the identified points of the particular mesh section (e.g., a weighted combination, giving more weight to certain points such as, for example, center points) and then determines whether the mesh section occlusion value meets or exceeds a mesh section occlusion threshold.

In some instances, one or more vertices of a model may be orphaned by the removal of mesh sections according to the occlusion reduction process described hereinabove. Accordingly, in some implementations, the occlusion reduction process also includes a step for removing vertices that are orphaned by the removal of mesh sections from the model.

Figure 3:
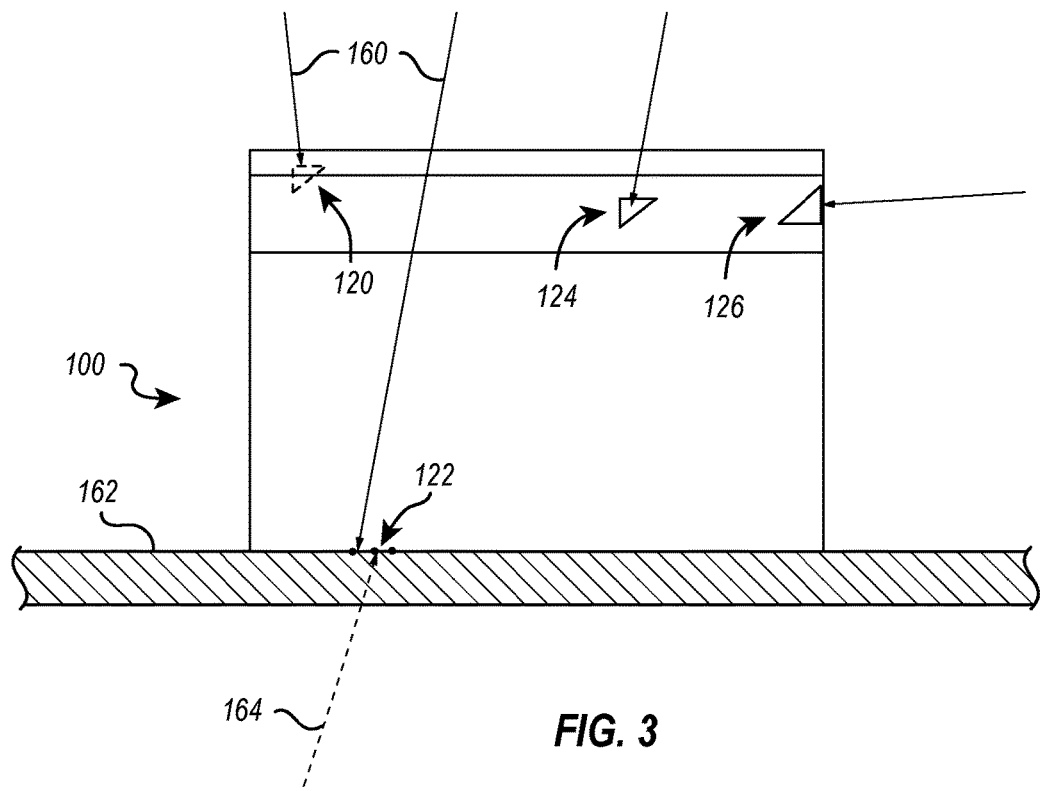
FIG. 3 illustrates a conceptual representation of performing ray cast rendering on various points of the model when the model is in a different state.

FIG. 3 illustrates a conceptual representation of performing ray cast rendering on various points of the model 100 when the model is in a different state. In some instances, a model file comprises an animation in which a 3D model undergoes a change of state. FIG. 3 represents an embodiment in which the furniture model 100 is in an open state, in contrast with the closed state shown in FIGS. 1 and 2. When a model 100 will be presented in an AR environment in multiple states, in some implementations, a system performs ray cast rendering on each of the identified points of the various mesh sections in each of the states in which the model 100 will be presented to determine occlusion values for each of the identified points in each of the states. The system may then proceed with steps outlined hereinabove, such as determining whether the various occlusion values of the various points in the various states meet or exceed an occlusion threshold, determining mesh section occlusion values in the various states and checking the same against a mesh section occlusion threshold, etc. In some implementations, a system only removes a mesh section from a model upon determining that each mesh section occlusion value exceeds the mesh section occlusion threshold in each state in which the model will be presented.

Referring again to FIG. 3, whereas the points of mesh sections 124 and 122 were occluded in the model 100 states shown FIGS. 1 and 2, the points of mesh sections 124 and 122 are exposed when the model 100 is in the open state shown in FIG. 3 (e.g., at least some rays 160 are able to reach the points, as shown). Similarly, while mesh section 126 was only partially unoccluded in the model 100 states shown in FIGS. 1 and 2, the points of mesh section 126 are all unoccluded when the model 100 is in the open state shown in FIG. 3 (e.g., at least some rays 160 are able to reach the points, as shown). Accordingly, in some embodiments, a system will refrain from removing mesh sections 124 and 122 from model 100 because in at least some states, these mesh sections are unoccluded.

Accordingly, by performing an occlusion reduction process, a computing system may optimize a model of a model file for viewing in an AR scene or model, based on how the model will be viewed in the AR scene or model. This may reduce the file size of AR scene or model files, allowing lower-end systems to still enjoy AR content. For instance, in typical scenarios, when 3D models in CAD files are implemented into an AR environment, mesh sections for surfaces of the 3D model that will not be visible in the AR environment (e.g., threads of a screw that is screwed into a part) are carried into and processed in the AR environment, resulting in an unnecessarily large AR scene or model file and requiring unnecessary model processing by the AR platform. According to the occlusion reduction process described hereinabove, in some instances, mesh sections that will not be visible to the user (e.g., threads of a screw that is screwed into the part) become omitted from the model file, and are thus not carried into an AR model or scene file for display by an AR platform, saving on file size and computing resources.

In addition to an occlusion reduction process, a system may perform other optimization processes for optimizing a model of a model file. At least some optimizations may be based on conditions present in AR implementations (e.g., which may also be applicable in conventional 3D model viewing/editing implementations on a general-purpose computing system). For instance, because AR model or scene files are displayed by AR platforms with reference to the user's real world, real-world dimensions may be determined/known for a model that will be displayed in an AR implementation. Furthermore, many users experience models of an AR experience as though the models are positioned at a typical viewing distance from the user. For instance, AR models of mountain ranges may be comfortably viewed from a large viewing distance in AR experiences, while AR models of large-frame portraits may be typically viewed from an intermediate viewing distance in AR experiences, and AR models of jewelry may be desirably viewed from a close viewing distance in AR experience.

Figure 4A:
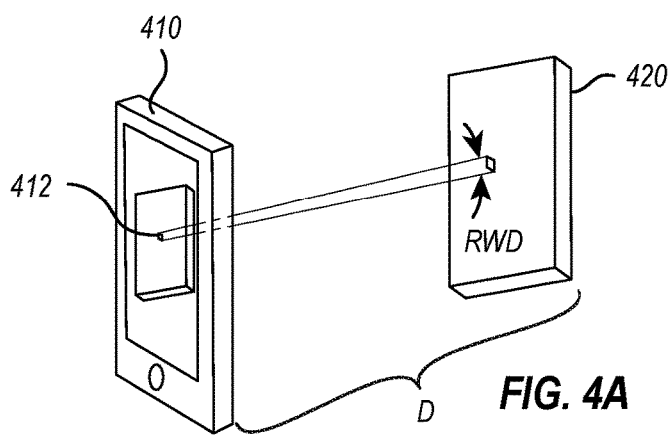
FIGS. 4A and 4B illustrates conceptual representations of a real-world distance associated with a viewing distance and a display device.
Figure 4B:
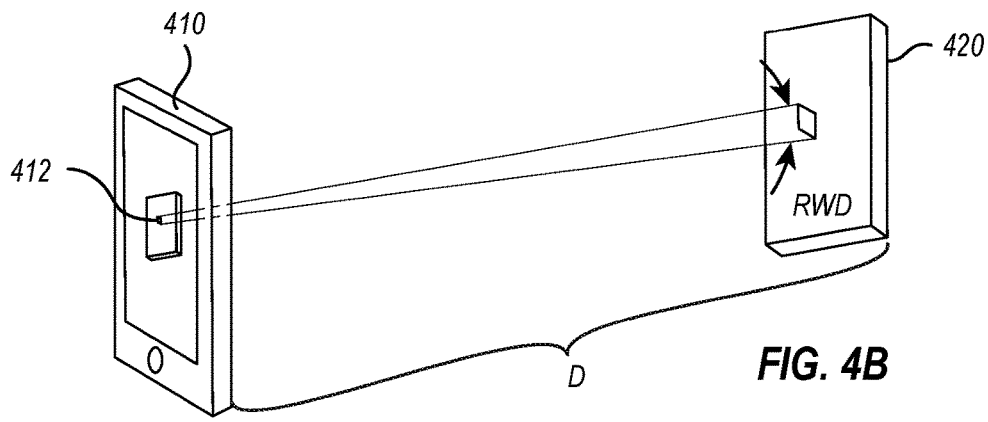

Many low-end AR devices (e.g., smartphones) display AR content overlaid on a representation of the user's real-world environment captured by one or more cameras. The real-world environment and the AR content are both displayed to a user on a screen with a known pixel resolution (e.g., a pixel resolution of the AR device). FIGS. 4A and 4B illustrate conceptual representations of a real-world distance (RWD) associated with a viewing distance (D) and a display device 410 of known pixel resolution. The viewing distance D is a distance that would exist between the display device 410 (e.g., a camera, screen, or another component or portion of the display device 410) and a virtual model 420 being displayed by the display device 410 if the virtual model 420 was present in the user's real-world environment. Because the display device 410 presents virtual model 420 as though it was in a real-world environment, real-world dimensions for presenting virtual model 420 can be identified. Accordingly, each pixel of a display screen of display device 410 will display a representation of a portion of the virtual model 420 when the virtual model is being displayed by the display device 410. The size of the portion of the virtual model 420 represented by each individual pixel of the display device 410 changes based on the viewing distance between the display device 410 and the virtual model 420.

For example, FIG. 4A conceptualizes a situation in which the display device 410 is displaying the virtual model 420 as though the virtual model 420 were positioned in close real-world proximity to the display device 410 at a distance (D). A pixel 412 of display device 410 represents all features of a certain portion of the virtual model 420, the size of the portion being represented by a real-world distance (RWD). The size of the portion may be related to the pixel resolution of display device 410 and/or the distance D. As the distance D grows larger, as conceptually represented in FIG. 4B, the RWD increases. Furthermore, in some instances, display devices with a higher screen pixel resolution may have a lower RWD associated therewith than other display devices with a lower screen pixel resolution for the same distance D.

Because a typical pixel 412 only display one color at a time, features of model 420 that are smaller than the RWD may not be resolvable or representable by the pixel 412, and therefore imperceptible to a user viewing a rendering of model 420 on a screen of display device 410. Allowing imperceptible features to remain in 3D model files used in AR experiences, therefore, unnecessarily bloats AR model or scene files and causes AR platforms to wastefully allocate processing resources. This is particularly important for large viewing distance situations since the RWD increases with viewing distance, increasing the section of the model apportioned to each pixel.

Accordingly, in some embodiments, a computing system performs a selective decimation step to eliminate imperceptible features from a model that may be used in AR scenes or model files. FIGS. 5A and 5B illustrate a conceptual representation of selective decimation being performed on several triangles of a model 500. Selective decimation involves, in some instances, identifying a real-world distance threshold (e.g., RWD shown in FIG. 5A). In some instances, the RWD threshold is based on a screen pixel resolution of a display device that will display model 500 and/or a predefined viewing distance (or range of viewing distances) between a display device and the model 500 in an AR environment, as described hereinabove with reference to FIGS. 4A and 4B. It should be noted that a viewing distance may be determined based on the size or other attributes of the model (e.g., a mountain range may have a greater comfortable viewing distance than a piece of jewelry, a ceiling tile may have a greater estimated viewing distance than a sofa, etc.), the level of detail and the general closeness of the vertices in the model, and/or based on user data indicative of how close users typically view the model in an AR environment, for example. An RWD threshold may also be based simply on a percent size of the overall model or be subjectively predefined by a developer.

Because the model 500 will, in some instances, be displayed in a real-world environment (e.g., as part of an AR experience), real-world dimensions may be applied to the model 500, and a system may determine real-world distances between the vertices of the model 500. For instance, referring to FIG. 5A, a system may determine that a distance between vertex 502 and vertex 504 is less than the RWD threshold. Accordingly, a pixel of a display device will be unable to fully represent the features between vertices 502 and 504. Therefore, in response to determining that the distance between vertices 502 and 504 is below the RWD threshold, the system may merge vertices 502 and 504, as shown in FIG. 5B. Merging vertices 502 and 504 reduces the overall number of mesh sections that will be saved as part of the model, which may reduce the file size of 3D and/or AR model or scene files and allow for faster processing, particularly in AR implementations.

Although the foregoing description of selective decimation focuses, in some respects, on AR implementations, those skilled in the art will recognize, in view of the present disclosure, that the principles described herein may be applicable under any 3D modeling circumstance in which a viewing distance to a virtual object and a pixel resolution for viewing a virtual object are established. It should also be noted that the "real-world distance" described herein is only designated as such for ease of description. As used herein, a real-world distance may comprise any distance measurement whether associated with a real-world space or a virtual space.

FIGS. 5A and 5B also illustrate conceptual representations of a texture reduction process. For instance, the arrangement of triangles shown in FIG. 5A may represent a u-v coordinate map, mapping the texture that will be applied to the various mesh sections of model 500 (e.g., mesh sections associated with vertices, such as vertices 502 and 504). The u-v map configuration may be updated to accommodate portions that are adjusted by the merging of vertices 502 and 504, resulting in a u-v map that corresponds to FIG. 5B.

Additionally, pursuant to a texture reduction process, a computing system may identify one or more features of one or more texture sections of the u-v coordinate map that include features that are smaller than the identified RWD distance. The computing system may then adjust the one or more texture sections to eliminate waste features that will not be perceptible to a user viewing the model 500. Adjustments may include, but are not limited to, removing features, replacing features with simpler ones, and/or adjusting texture resolution.

In this regard, pursuant to a texture reduction process, a system may identify a u-v map associated with a texture of the model comprising a plurality of map points associated with vertices of the model, determine a real-world distance threshold (e.g., RWD represented in FIG. 5A) and, in response to determining that two of the map points of the plurality of map points are associated with vertices that are positioned closer together than the real-world distance threshold, modifying one or more features of the u-v map that are between the two map points (e.g., by removing features, replacing features with simpler features, adjusting texture resolution, etc.).

In some implementations, an occlusion reduction process is more processing-intensive than other optimization techniques, such as selective decimation, in particular because of the ray cast rendering processes described hereinabove. Accordingly, in some embodiments, because selective decimation may result in the number of mesh sections of a model being reduced, a system performs selective decimation before occlusion reduction to reduce the number of mesh sections that the system must perform ray cast rendering on.

Additionally, because selective decimation and texture reduction processes may, in some instances, depend on the same RWD value, selective decimation and texture reduction processing may be performed simultaneously (e.g., in parallel) to save on processing time and as part of an automated process.

Figure 6:
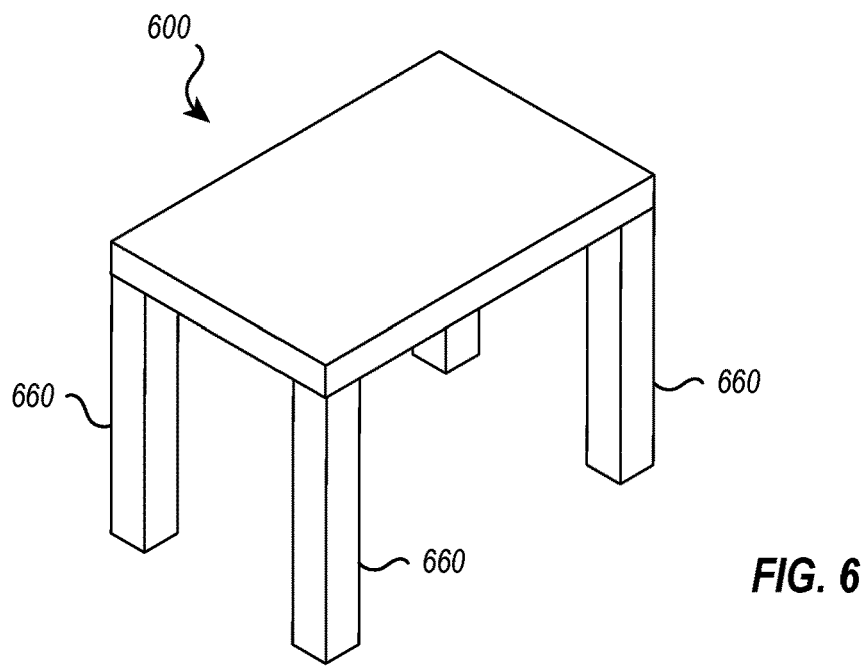
FIG. 6 illustrates an example of a 3D model that includes model objects that include identical vertices.

FIG. 6 illustrates an example of a 3D model 600 with model objects 660 that include identical vertices (shown as identical legs of a table). Because vertices are identical for model objects 660, data associated with each of the model objects 660 may be merged into a single buffer such that the model file only expresses data that is shared across the model objects 660 once (rather than redundantly). This technique may be referred to as "instancing."

In addition to the foregoing, those skilled in the art will appreciate that any number of the optimization techniques and processes disclosed hereinabove may be practiced in any combination or order. Furthermore, a system may also perform other optimization techniques in addition to those discussed hereinabove. For example, the foregoing optimization processes may be used in conjunction with conventional geometric compression techniques to provide a further compressed model file.

Additionally, a system may perform a texture formatting step, wherein the system identifies one or more features of a texture of the model and intelligently determines an optimal image format based on the features of the texture. The system then converts the texture of the model into the optimal image format. For example, a system my detect that a PNG image file does not have an alpha channel or does not use an alpha channel associated therewith. In response to so detecting, the system may resave the PNG image file without the alpha channel to reduce its size. In other examples, a system may determine that a texture includes large sections of a single color, with little color complexity, and convert the texture into an optimal image format (e.g., PNG rather than JPEG). In yet other examples, a system may determine that a texture includes complex, realistic combinations of colors and/or shading and convert the texture into an optimal image format (e.g., JPEG rather than PNG).

Additionally, or alternatively, a system may format a texture based on an identified intended and/or predetermined use for the texture that is associated with the model (e.g., a texture that is configured for display on a mesh of the model). For example, a system may determine a type of map associated with the texture (e.g., a normal map, a diffuse map, an emissive map, an opacity map, a specular map, a gloss map, etc.) and format the texture based on the type of map associated with the texture. In some implementations, some image formats may be optimal for representing a particular map type, whereas some image formats may be ill-suited for representing a particular map type. By way of illustration, in some instances, performing JPEG compression may give rise to compression artifacts (e.g., compression rectangles) that may distort normal maps. However, JPEG compression artifacts are often imperceptible in diffuse maps. Accordingly, in some instances, a system may determine an intended or predetermined use of an identified texture (e.g., as a normal map or as a diffuse map) and select an appropriate texture format so as to avoid visible artifacts.

For example, a system may determine that a texture associated with a model (e.g., a texture that will be presented on a mesh of the model) will be used as a normal map (or another bump map, in some instances). After making such a determination, the system may, in some instances, preclude the texture from being converted into a JPEG format (e.g., to avoid artifacts), even where the JPEG format might otherwise be suitable for depicting the features represented in the texture. In another example, a system may determine that a texture associated with a model will be used as a diffuse map (or another color map, in some instances). After making such a determination, the system may, in some instances, permit the texture to be converted into the JPEG format (e.g., because artifacts may be imperceptible).

In other instances, a system performs a step of clearing custom normal vectors of vertices and replacing them with an automatic normal, thereby allowing at least some of the vertex data to be merged/shared among the vertices.

In other instances, the system applies conventional decimation techniques, but intelligently determines the optimal decimation technique based on attributes (e.g., concavity, curvature, polygon density, etc.) of the portion of the model that will be decimated.

In yet other instances, the system performs acts of re-meshing and normal map rebaking, wherein the system constructs a low polygon model from a high polygon model and bakes a new normal map texture from the difference between the initial high polygon model and the low polygon model. The system also rebakes other maps, such as diffuse maps, normal maps, metallic and/or roughness maps, etc.

Upon completing all desired optimization techniques, the system outputs an optimized model file (e.g., in the form of a 3D model file, or an AR model or scene file). In some implementations, the system also converts the optimized model file into a plurality of AR model or scene file formats that are configured for display on different AR platforms.

Accordingly, at least some of the systems and methods disclosed herein all for low-end AR platforms (e.g., hand-held devices with limited hardware capabilities) to render AR experiences that include detailed 3D models. Additionally, at least some optimization methods of the present disclosure account for the real-world environments in which a user will experience the 3D models of the AR content, providing optimizations techniques that are uniquely tailored to AR experiences. Furthermore, at least some optimization techniques disclosed herein allow for reduction in the file size of 3D model files and/or AR model or scene files without sacrificing visual fidelity. Disclosed embodiments may also allow AR content developers to confidently develop AR content for use on lower-end AR platforms (e.g., smartphones), thus opening new markets and allowing users to share AR experiences peer-to-peer without concern that an AR experience will be unrenderable on a peer's AR platform.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
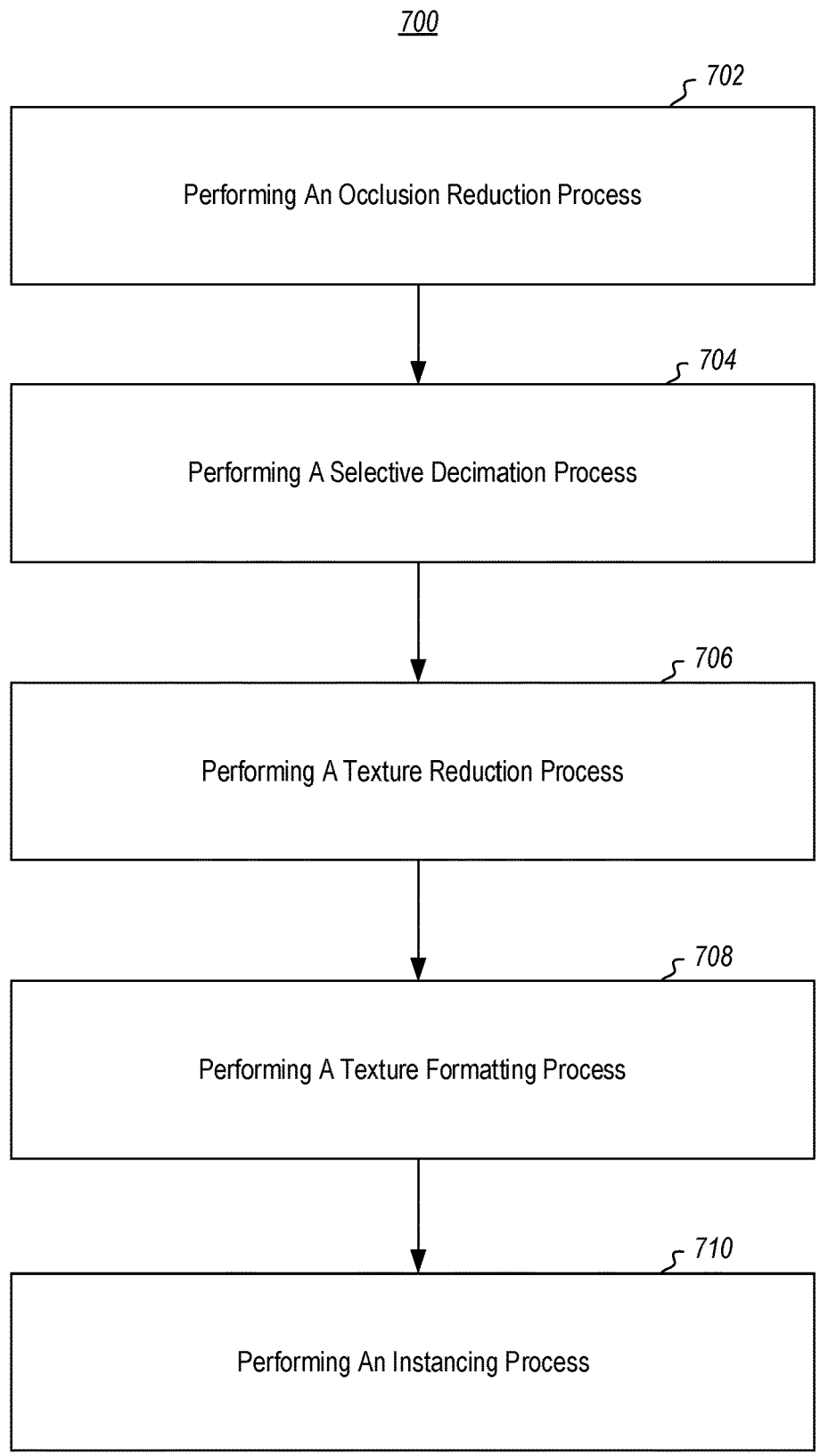
FIG. 7 illustrates an example flow diagram depicting a method for optimizing a model file.

FIG. 7 illustrates an example flow diagram 700 that depicts various act associated with optimizing a model file, according to implementations of the present disclosure. Act 702 is performing an occlusion reduction process, act 704 is performing a selective decimation process, act 706 is performing a texture reduction process, act 708 is performing a texture formatting process, and act 710 is performing an instancing process. Each of the acts represented in flow diagram 700 may include sub-acts associated therewith, which are illustrated hereinbelow with reference to FIGS. 8-12.

Those skilled in the art will recognize, in view of the present disclosure, that various embodiments of the present disclosure may implement any number of the various acts depicted in flow diagrams 700, 800, 900, 1000, 1100, and/or 1200, such as one, two, or more of the depicted acts. Relatedly, some embodiments of the present disclosure omit one or more of the acts depicted in flow diagrams 700, 800, 900, 1000, 1100, and/or 1200. Furthermore, it should be noted that the various acts depicted in flow diagrams 700, 800, 900, 1000, 1100, and/or 1200 may be performed in addition to other optimization/compression techniques.

Figure 8:
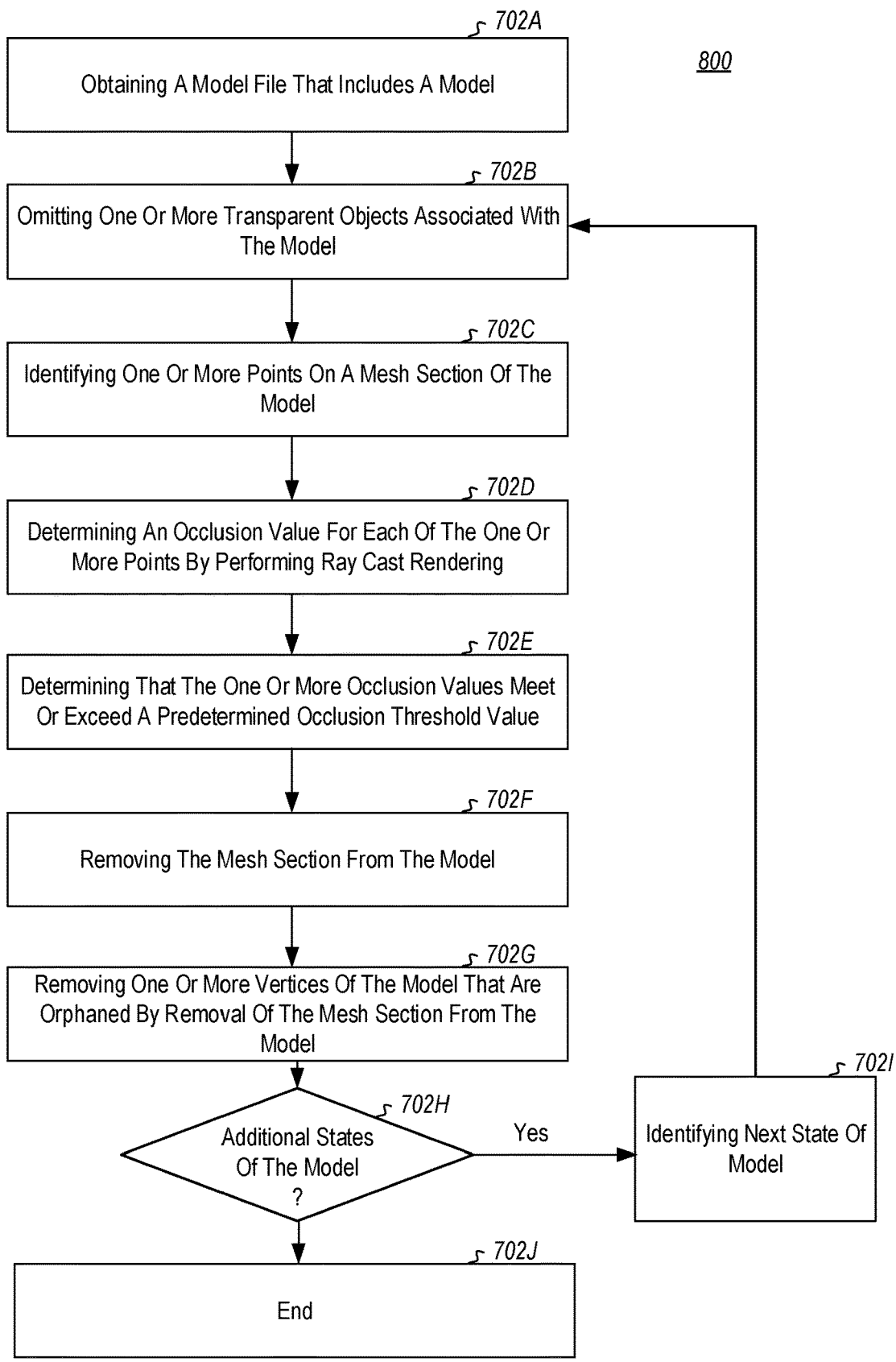
FIG. 8 illustrates an example flow diagram depicting a method for performing an occlusion reduction process.

FIG. 8 illustrates an example flow diagram 800 that depicts various acts associated with performing an occlusion reduction process (i.e., act 702 from flow diagram 700).

Act 702A of flow diagram 800 is obtaining a model file that includes a model. The model file comprises any type of AR model or scene file or 3D model file that includes 3D models and/or objects, such as, by way of non-limiting example, .usdz, .reality, .gltf, .glb, .obj, .fbx, .dae, .sfb, 3DS, A3D, COB, SCN, C4D, DAE, DXF, IGES, IV, FBX, KMZ, LW, LWB, LWM, LWO, LWS, LXO, MA, MB, MAX, OBJ, PLY, SKP, STEP, STL, WRL, WRL97, VRML, X, X3D, or XS formats.

Act 702B of flow diagram 800 is omitting one or more transparent objects associated with the model. In some instances, transparent objects of a model are intended to at least partially transmit light to provide views therethrough when implemented into an AR environment (e.g., windows). Accordingly, in instances where transparent objects are not intended to be occlusive, transparent objects may be omitted from the model for performing the occlusion reduction process (e.g., for performing ray cast rendering as described herein).

Act 702C of flow diagram 800 is identifying one or more points on a mesh section of the model. In some instances, the mesh sections are triangular sections, but any polygonal and/or curved sections (or combinations thereof) are within the scope of this disclosure. In some instances, the one or more points of the mesh section identified according to act 702C are points along one or more edges of the mesh section, points on a surface of the mesh section (e.g., on a center of the mesh section), and/or points on a corner of the mesh section.

Act 702D of flow diagram 800 is determining an occlusion value for each of the one or more points by performing ray cast rendering. In some instances, ray cast rendering includes casting various rays (e.g., representative of ambient light) toward the identified points from various angles to determine whether the rays reach the identified points or whether the rays are occluded by other parts of the model. The occlusion value for each of the one or more points may be determined based on the number of rays that reach (or fail to reach) each of the one or more points (e.g., represented as a ratio or percentage, number of rays, binary value indicating whether any rays reached the point, etc.).

In some implementations, the ray cast rendering process omits certain rays from processing, such as rays that are associated with environmental surfaces (or surfaces of other 3D objects). For example, a ray cast rendering process may omit rays that share a directional component with a normal vector of an environmental object (or another 3D object) that the model will be presented within a threshold proximity to (e.g., in an AR implementation, or in any 3D graphics implementation).

Act 702E of flow diagram 800 is determining that the one or more occlusion values meet or exceed a predetermined occlusion threshold value. In some instances, a system applies a point-level occlusion threshold to each occlusion value for each point and determines a mesh section occlusion value based on whether, how many of, and/or which of the points of the mesh section met or exceeded the point-level occlusion threshold (e.g., certain points can be given more weight, such as center points). The system may then, in some implementations, determine that the mesh section occlusion value meets or exceeds a predetermined mesh section occlusion threshold value.

In other instances, the mesh section occlusion value is determined based on a combination (e.g., a weighted combination) of the occlusion values for the one or more points of the mesh section, without regard to whether the occlusion values for the various points meet or exceed a point-level occlusion threshold. The predetermined occlusion threshold value may be selected and/or varied based on various factors, such as an intended or predetermined use for the model and/or a representation of a desired tradeoff between compression ratio and model accuracy.

Act 702F of flow diagram 800 is removing the mesh section from the model. Removing mesh sections from the model may reduce the file size of the model file of which the model is a part (e.g., AR model or scene file or 3D model/object file). Furthermore, act 702G of flow diagram 800 is removing one or more vertices of the model that are orphaned by removal of the mesh section from the model.

In some instances, a model of a model file can have multiple states associated therewith (e.g., where the model is configured to undergo a transformation, movement, and/or other animation). Thus, decision block 702H involves determining whether the model is associated with additional states. If the model is associated with additional states, act 702I is identifying the next state of the model, after which any of acts 702B-702G may be repeated for the identified next state of the model. If the model is not associated with additional states, processing may proceed to end 702J.

Although acts 702B-702G are described with reference to a single mesh section, those skilled in the art will recognize, in view of the present disclosure, that references herein to a mesh section can refer to one or more mesh sections, and references herein to any singular object can refer to any number of that singular object. Similarly, references herein to multiple objects can refer to a single object.

Figure 9:
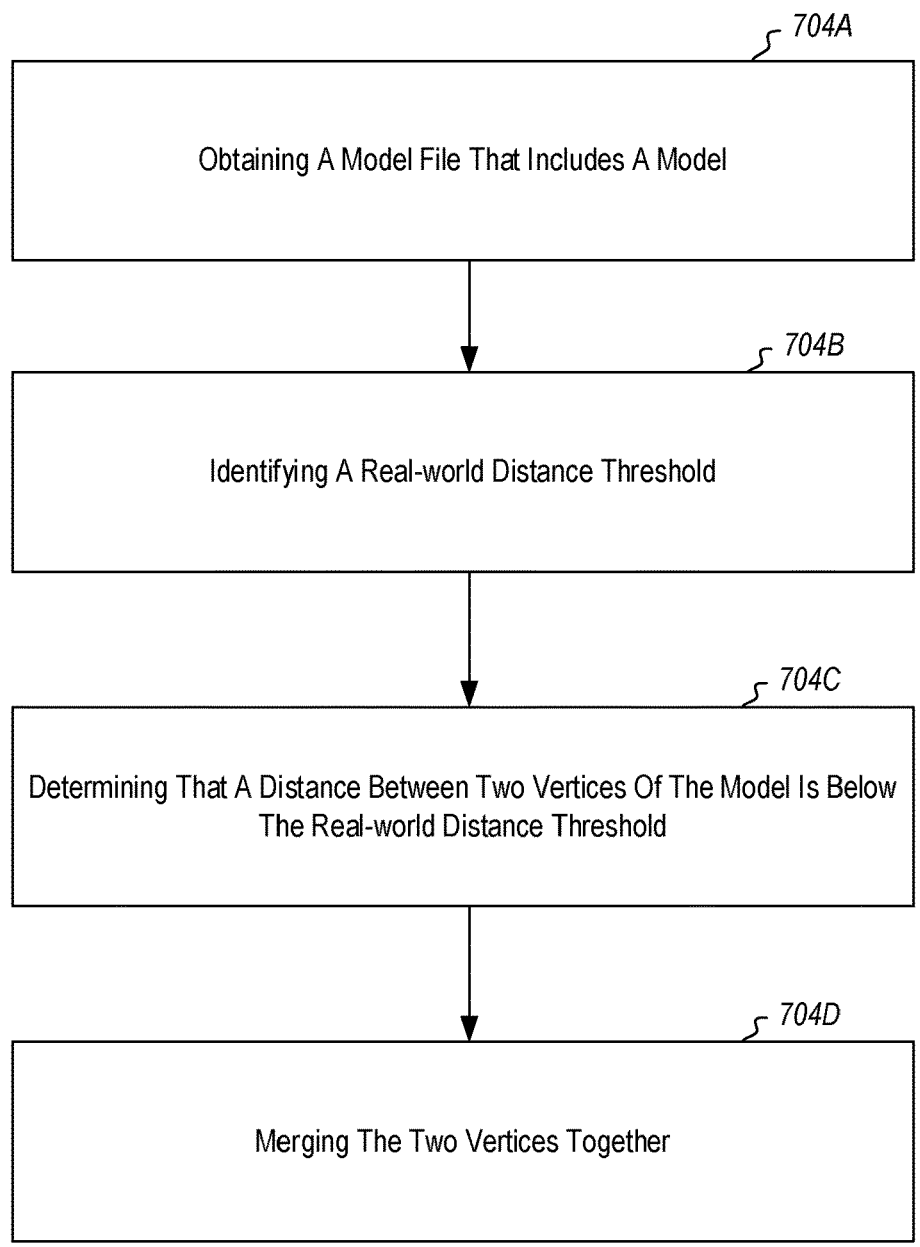
FIG. 9 illustrates an example flow diagram depicting a method for performing a selective decimation process.

FIG. 9 illustrates an example flow diagram 900 that depicts various acts associated with performing a selective decimation process (i.e., act 704 from flow diagram 700). Act 704A of flow diagram 900 is obtaining a model file that includes a model. In some implementations, act 704A is performed similar to act 702A described hereinabove.

Act 704B of flow diagram 900 is identifying a real-world distance threshold. In some instances, the real-world distance threshold is based on a predefined viewing distance or range of distances for viewing the model. The real-world distance threshold may also be based on a screen pixel resolution (or range of screen pixel resolutions) that will be used to view the model in implementations (whether in AR implementations or other 3D model implementations).

Act 704C of flow diagram 900 is determining that a distance between two vertices of the model is below the real-world distance threshold. In some instances, a pixel of a display device for viewing the model (e.g., at the predefined viewing distance or within the range of viewing distances) is unable to fully represent features between vertices that are closer together than the real-world distance threshold.

Accordingly, in response to determining that the distance between the two vertices of the model are below the real-world distance threshold, a system may perform act 704D of flow diagram 900, which is merging the two vertices together. Merging the two vertices together may reduce the file size of the model file of which the model is a part (e.g., AR model or scene file or 3D model/object file).

Figure 10:
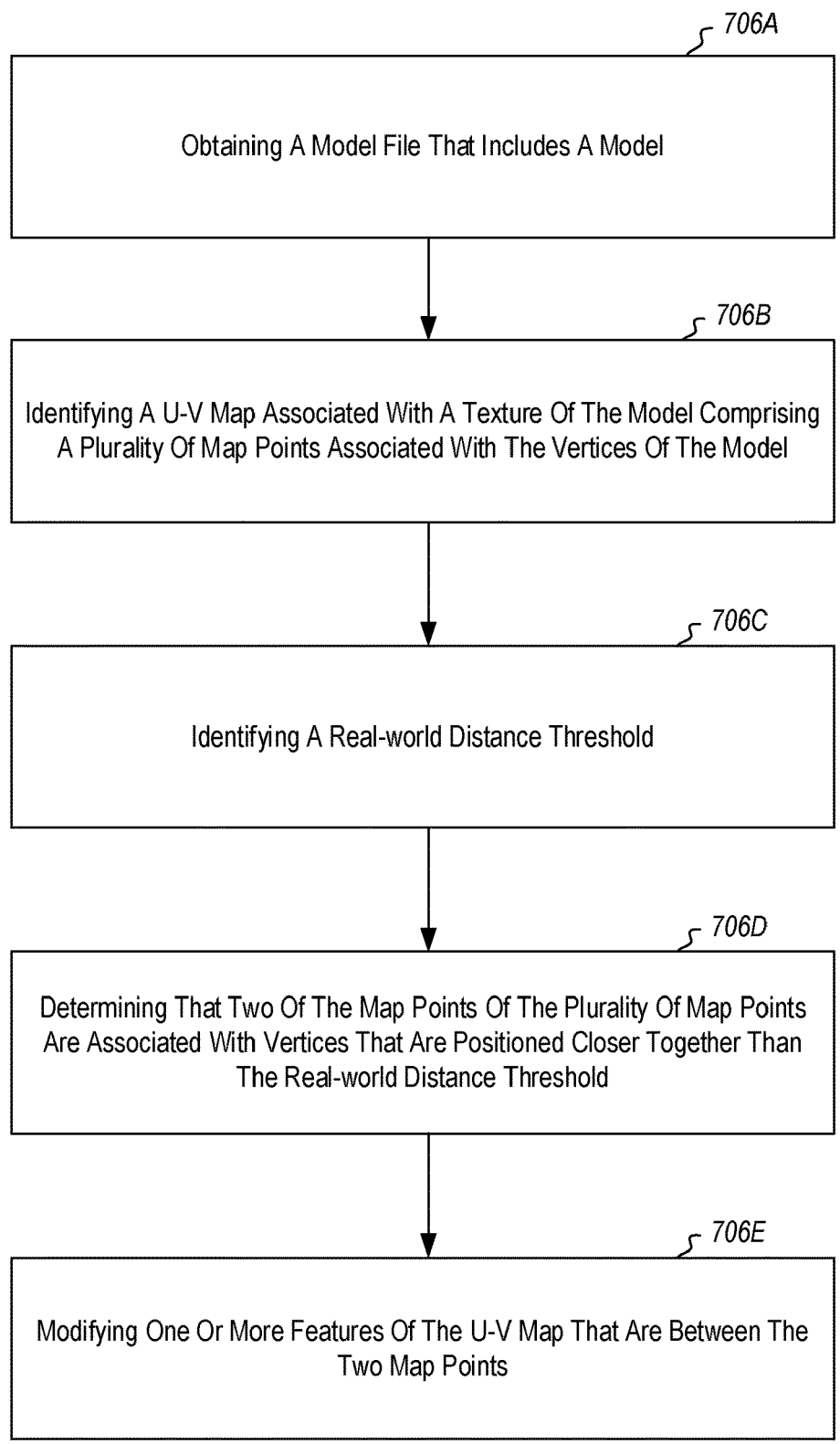
FIG. 10 illustrates an example flow diagram depicting a method for performing a texture reduction process.

FIG. 10 illustrates an example flow diagram 1000 that depicts various acts associated with performing a texture reduction process (i.e., act 706 from flow diagram 700). Act 706A of flow diagram 1000 is obtaining a model file that includes a model. In some implementations, act 706A is performed similar to act 702A described hereinabove.

Act 706B of flow diagram 1000 is identifying a u-v map associated with a texture of the model comprising a plurality of map points associated with the vertices of the model. In some instances, the u-v map maps the texture that will be applied to the various mesh sections of the model (e.g., mesh sections with vertices that correspond to the map points).

Act 706C of flow diagram 1000 is identifying a real-world distance threshold. As noted hereinabove with reference to act 704B, the real-world distance threshold may be based on a predefined viewing distance or range of distances for viewing the model. The real-world distance threshold may also be based on a screen pixel resolution (or range of screen pixel resolutions) that will be used to view the model in implementations (whether in AR implementations or other 3D model implementations).

Act 706D of flow diagram 1000 is determining that two of the map points of the plurality of map points are associated with vertices that are positioned closer together than the real-world distance threshold. In some instances, a pixel of a display device for viewing the model (e.g., at the predefined viewing distance or within the range of viewing distances) is unable to fully represent features between map points that are closer together than the real-world distance threshold.

Accordingly, in response to determining that the distance between the two map points of the plurality of map points are associated with vertices that are positioned closer together than the real-world distance threshold, a system may perform act 706E of flow diagram 1000, which is modifying one or more features of the u-v map that are between the two map points. In some instances, modifying the one or more features may include removing features, replacing features with simpler features, adjusting texture resolution and/or effects (e.g., blurring), etc. In some instances, modifying the one or more features of the u-v map that are between the two map points may reduce the file size of the model file of which the model is a part (e.g., AR model or scene file or 3D model/object file).

Figure 11:
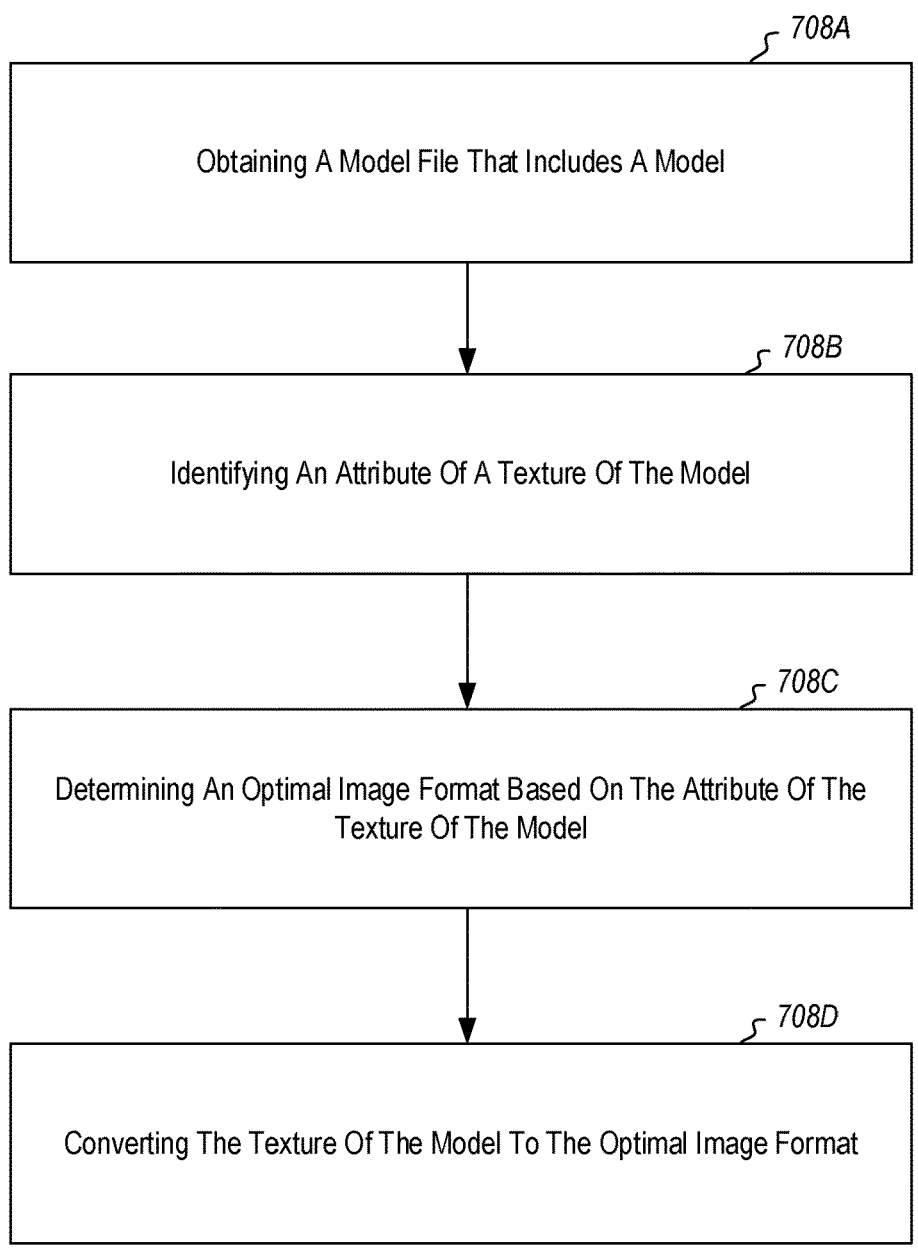
FIG. 11 illustrates an example flow diagram depicting a method for performing a texture formatting process.

FIG. 11 illustrates an example flow diagram 1100 that depicts various acts associated with performing a texture formatting process (i.e., act 708 from flow diagram 700). Act 708A of flow diagram 1100 is obtaining a model file that includes a model. In some implementations, act 706A is performed similar to act 702A described hereinabove.

Act 708B of flow diagram 1100 is identifying an attribute of a texture of the model. In some instances, the attribute of the texture of the model includes an intended and/or predefined use of the texture, such whether the texture will be applied as a normal map or a diffuse map. Additionally, or alternatively, the attribute of the texture of the model include, in some instances, one or more features of the of the texture, such as channels present (e.g., alpha channels), color diversity/complexity/combinations, shading, etc.

Act 708C of flow diagram 1100 is determining an optimal image format based on the attribute of the texture of the model. For example, in some instances, an optimal image format for textures that include few colors and/or little color complexity may be the PNG format. In some instances, an optimal image format for textures with complex colors, combinations of colors, and/or shading may be the JPEG format. Furthermore, in some implementations, an optimal image format for a texture that will be used as a normal map avoids the JPEG format, which can give rise to compression artifacts. In other instances, an optimal image format for a diffuse map may include the JPEG format, in particular because compression artifacts may be imperceptible to viewers.

Act 708D of flow diagram 1100 is converting the texture of the model to the optimal image format (e.g., PNG, JPEG, or another format). In some instances, converting the texture of the model to the optimal image format may reduce the file size of the model file of which the model is a part (e.g., AR model or scene file or 3D model/object file).

Figure 12:
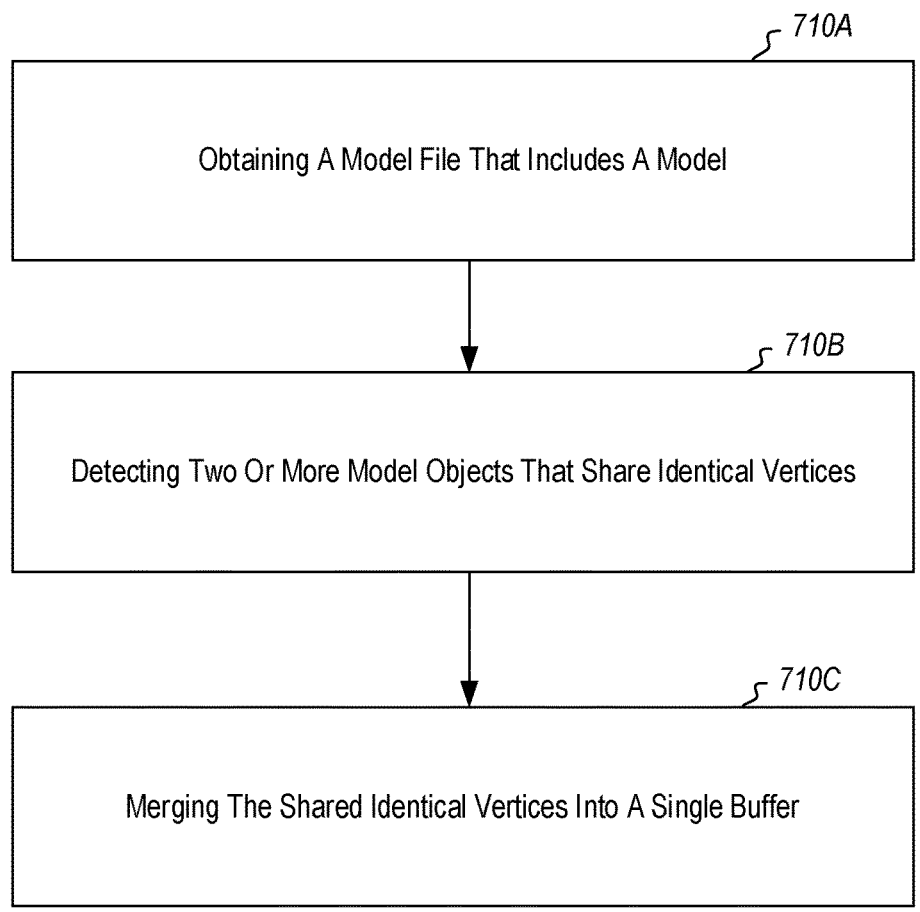
FIG. 12 illustrates an example flow diagram depicting a method for performing an instancing process.

FIG. 12 illustrates an example flow diagram 1200 that depicts various acts associated with performing an instancing process (i.e., act 710 from flow diagram 700). Act 710A of flow diagram 1200 is obtaining a model file that includes a model. In some implementations, act 710A is performed similar to act 702A described hereinabove.

Act 710B of flow diagram 1200 is detecting two or more model objects that share identical vertices. Objects that include identical vertices often redundantly express data for the objects represented in the model in a space-inefficient manner. Accordingly, a system may perform act 710C of flow diagram 1200, which is merging the shared identical vertices into a single buffer. In some instances, merging the shared identical vertices into a single buffer may reduce the file size of the model file of which the model is a part (e.g., AR model or scene file or 3D model/object file).

Computer Systems of the Present Disclosure

It will be appreciated that computer systems are increasingly taking a wide variety of forms. In this description and in the claims, the term "computer system" or "computing system" is defined broadly as including any device or system—or combination thereof—that includes at least one physical and tangible processor and a physical and tangible memory capable of having thereon computer-executable instructions that may be executed by a processor. It will be appreciated that multiple processors that perform different or identical processing functions may be implemented in a single computing system, such as various combinations of a central processing units (CPUs), graphics processing units (GPUs), and/or holographic processing units (HPUs). By way of example, not limitation, the term "computer system" or "computing system," as used herein is intended to include at least personal computers, desktop computers, laptop computers, tablets, hand-held devices (e.g., mobile telephones, PDAs, pagers), microprocessor-based or programmable consumer electronics, minicomputers, mainframe computers, multi-processor systems, network PCs, distributed computing systems, datacenters, message processors, routers, switches, XR HMDs, and/or other wearable devices.

The memory may take any form and may depend on the nature and form of the computing system. The memory can be physical system memory, such as one or more hardware storage devices, which may include volatile memory, non-volatile memory, or some combination of the two. The term "memory" may also be used herein to refer to non-volatile mass storage such as physical storage media.

The computing system also has thereon multiple structures often referred to as an "executable component." For instance, the memory of a computing system can include an executable component. The term "executable component" is the name for a structure that is well understood to one of ordinary skill in the art in the field of computing as being a structure that can be software, hardware, or a combination thereof.

For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media. The structure of the executable component exists on a computer-readable medium in such a form that it is operable, when executed by one or more processors of the computing system, to cause the computing system to perform one or more functions, such as the functions and methods described herein. Such a structure may be computer-readable directly by a processor—as is the case if the executable component were binary. Alternatively, the structure may be structured to be interpretable and/or compiled—whether in a single stage or in multiple stages—so as to generate such binary that is directly interpretable by a processor.

The term "executable component" is also well understood by one of ordinary skill as including structures that are implemented exclusively or near-exclusively in hardware logic components, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination thereof.

The terms "component," "service," "engine," "module," "control," "generator," or the like may also be used in this description. As used in this description and in this case, these terms—whether expressed with or without a modifying clause—are also intended to be synonymous with the term "executable component" and thus also have a structure that is well understood by those of ordinary skill in the art of computing.

While not all computing systems require a user interface, in some embodiments a computing system includes a user interface for use in communicating information from/to a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, projections, holograms, cameras, keyboards, stylus, mouse, or other pointer input, sensors of any type, and so forth.

Accordingly, embodiments described herein may comprise or utilize a special purpose or general-purpose computing system. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments disclosed or envisioned herein can comprise at least two distinctly different kinds of computer-readable media: storage media and transmission media.

Computer-readable storage media include RAM, ROM, EEPROM, solid state drives ("SSDs"), flash memory, phase-change memory ("PCM"), CD-ROM or other optical disk storage, magnetic disk storage or other magnetic storage devices, or any other physical and tangible storage medium that can be used to store desired program code in the form of computer-executable instructions or data structures and that can be accessed and executed by a general purpose or special purpose computing system to implement the disclosed functionality of the invention. For example, computer-executable instructions may be embodied on one or more computer-readable storage media to form a computer program product.

Transmission media can include a network and/or data links that can be used to carry desired program code in the form of computer-executable instructions or data structures and that can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also—or even primarily—utilize transmission media.

Those skilled in the art will further appreciate that a computing system may also contain communication channels that allow the computing system to communicate with other computing systems over, for example, a network. Accordingly, the methods described herein may be practiced in network computing environments with many types of computing systems and computing system configurations. The disclosed methods may also be practiced in distributed system environments where local and/or remote computing systems, which are linked through a network (either by hardwired data links, wireless data links, or by a combination of hardwired and wireless data links), both perform tasks. In a distributed system environment, the processing, memory, and/or storage capability may be distributed as well.

Those skilled in the art will also appreciate that the disclosed methods may be practiced in a cloud computing environment. Cloud computing environments may be distributed, although this is not required. When distributed, cloud computing environments may be distributed internationally within an organization and/or have components possessed across multiple organizations and/or entities. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Although the subject matter described herein is provided in language specific to structural features and/or methodological acts, it is to be understood that the subject matter defined in the appended claims is not necessarily limited to the described features or acts so described. Rather, the described features and acts are disclosed as example forms of implementing the claims.

CONCLUSION

Unless defined otherwise, all technical and scientific terms used herein have the same meaning as commonly understood by one of ordinary skill in the art to which the present disclosure pertains.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. A system for optimizing a model file, comprising:
one or more processors; and
one or more hardware storage devices storing computer-executable instructions that are operable, when executed by the one or more processors, to configure the system to:
perform a selective decimation process, comprising configuring the system to:
identify a model portion size threshold associated with presenting a model for viewing, wherein the model portion size threshold is based on a viewing distance or range of viewing distances for viewing the model and a screen pixel resolution of a screen of a device for viewing the model;
determine that a distance between two vertices of the model is below the model portion size threshold; and
merge the two vertices together.

2. The system of claim 1, wherein the computer-executable instructions are further operable, when executed by the one or more processors, to configure the system to:
perform a texture reduction process, comprising configuring the system to:
identify a u-v map associated with a texture of the model comprising a plurality of map points associated with vertices of the model; and in response to determining that two map points of the plurality of map points are associated with vertices that are positioned closer together than the model portion size threshold, modify one or more features of the u-v map that are between the two map points.

3. The system of claim 1, wherein the computer-executable instructions are further operable, when executed by the one or more processors, to configure the system to:
perform an occlusion reduction process, comprising configuring the system to:
identify one or more points on a mesh section of the model;
determine one or more occlusion values for the one or more points on the mesh section by performing a ray cast rendering of the one or more points;
determine that the one or more occlusion values meet or exceed a predetermined occlusion threshold value; and
remove the mesh section from the model.

4. The system of claim 3, wherein the occlusion reduction process further comprises configuring the system to identify one or more transparent objects associated with the model and omitting the one or more transparent objects from the model for performing the occlusion reduction process.

5. The system of claim 3, wherein the ray cast rendering omits rays that are associated with one or more environmental surfaces.

6. The system of claim 3, wherein the occlusion reduction process further comprises configuring the system to remove one or more vertices of the model that are orphaned by the removal of the mesh section from the model.

7. The system of claim 3, wherein the occlusion reduction process comprises configuring the system to perform ray cast rendering on the one or more points for a plurality of states of the model.

8. The system of claim 3, wherein the mesh section is a triangular section.

9. The system of claim 3, wherein the one or more points on the mesh section include at least one of: a point along an edge of the mesh section, a point on a center of the mesh section, or a point on a corner of the mesh section.

10. The system of claim 1, wherein the computer-executable instructions are further operable, when executed by the one or more processors, to configure the system to:
perform an instancing process, comprising configuring the system to:
detect two or more model objects of the model that share identical vertices; and
merge the shared identical vertices into a single buffer.

11. The system of claim 1, wherein the computer-executable instructions are further operable, when executed by the one or more processors, to configure the system to:
perform a texture formatting process, comprising configuring the system to:
obtain a model file comprising a model;
identify a texture of the model configured for display on a mesh of the model;
identify an attribute of the texture configured for display on the mesh of the model;
determine an optimal image format for the texture based on the attribute of the texture; and
convert the texture for display on the mesh of the model to the optimal image format.

12. The system of claim 11, wherein the attribute of the texture of the model is a predetermined use of the texture.

13. The system of claim 11, wherein the attribute of the texture of the model is a feature of the texture of the model.

14. The system of claim 1, wherein the computer-executable instructions are further operable, when executed by the one or more processors, to configure the system to replace a custom normal vector of a vertex with an automatic normal.

15. The system of claim 1, wherein the model is a 3D object from (i) an augmented reality model or scene file, (ii) a virtual reality model or scene file, or (iii) a 3D model file.

16. The system of claim 1, wherein the computer-executable instructions are further operable, when executed by the one or more processors, to configure the system to output an optimized model file comprising the model.

17. The system of claim 16, wherein the computer-executable instructions are further operable, when executed by the one or more processors, to configure the system to:
convert the optimized model file into (i) a plurality of augmented reality object file formats, (ii) a plurality of virtual reality object file formats, or (iii) a 3D model file format.

18. A method for optimizing a model file, comprising:
performing a selective decimation process, comprising:
identifying a model portion size threshold associated with presenting a model for viewing, wherein the model portion size threshold is based on a viewing distance or range of viewing distances for viewing the model and a screen pixel resolution of a screen of a device for viewing the model;
determining that a distance between two vertices of the model is below the model portion size threshold; and
merging the two vertices together.

19. One or more hardware storage devices storing computer-executable instructions that are operable, when executed by one or more processors of a system, to configure the system to:
perform a selective decimation process, comprising configuring the system to:
identify a model portion size threshold associated with presenting a model for viewing, wherein the model portion size threshold is based on a viewing distance or range of viewing distances for viewing the model and a screen pixel resolution of a screen of a device for viewing the model;
determine that a distance between two vertices of the model is below the model portion size threshold; and
merge the two vertices together.

* * * * *